(12) United States Patent
Clark et al.

(10) Patent No.: US 7,447,845 B2
(45) Date of Patent: Nov. 4, 2008

(54) DATA PROCESSING SYSTEM, PROCESSOR AND METHOD OF DATA PROCESSING IN WHICH LOCAL MEMORY ACCESS REQUESTS ARE SERVICED BY STATE MACHINES WITH DIFFERING FUNCTIONALITY

(75) Inventors: Leo J. Clark, Georgetown, TX (US); Guy L. Guthrie, Austin, TX (US); William J. Starke, Round Rock, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 11/457,333

(22) Filed: Jul. 13, 2006

(65) Prior Publication Data

US 2008/0016279 A1 Jan. 17, 2008

(51) Int. Cl.
*G06F 12/00* (2006.01)

(52) U.S. Cl. ................... 711/146; 711/118; 711/140; 711/210

(58) Field of Classification Search ............. 711/118, 711/140, 146, 210
See application file for complete search history.

(56) References Cited

U.S. PATENT DOCUMENTS

| 2002/0087807 A1* | 7/2002 | Gharachorloo et al. ....... 711/141 |
| 2004/0139305 A1* | 7/2004 | Arimilli et al. .............. 712/227 |
| 2005/0132148 A1* | 6/2005 | Arimilli et al. .............. 711/154 |
| 2006/0259707 A1* | 11/2006 | Freytag ...................... 711/146 |

* cited by examiner

*Primary Examiner*—Reba I Elmore
(74) *Attorney, Agent, or Firm*—Casimer K. Salys; Dillon & Yudell LLP

(57) ABSTRACT

A data processing system includes a local processor core and a cache memory coupled to the local processor core. The cache memory includes a data array, a directory of contents of the data array, at least one snoop machine that services memory access requests of a remote processor core, and multiple state machines that service memory access requests of the local processor core. The multiple state machines include a first state machine that has a first set of memory access requests of the local processor core that it is capable of servicing and a second state machine that has a different second set of memory access requests of the local processor core that it is capable of servicing.

18 Claims, 7 Drawing Sheets

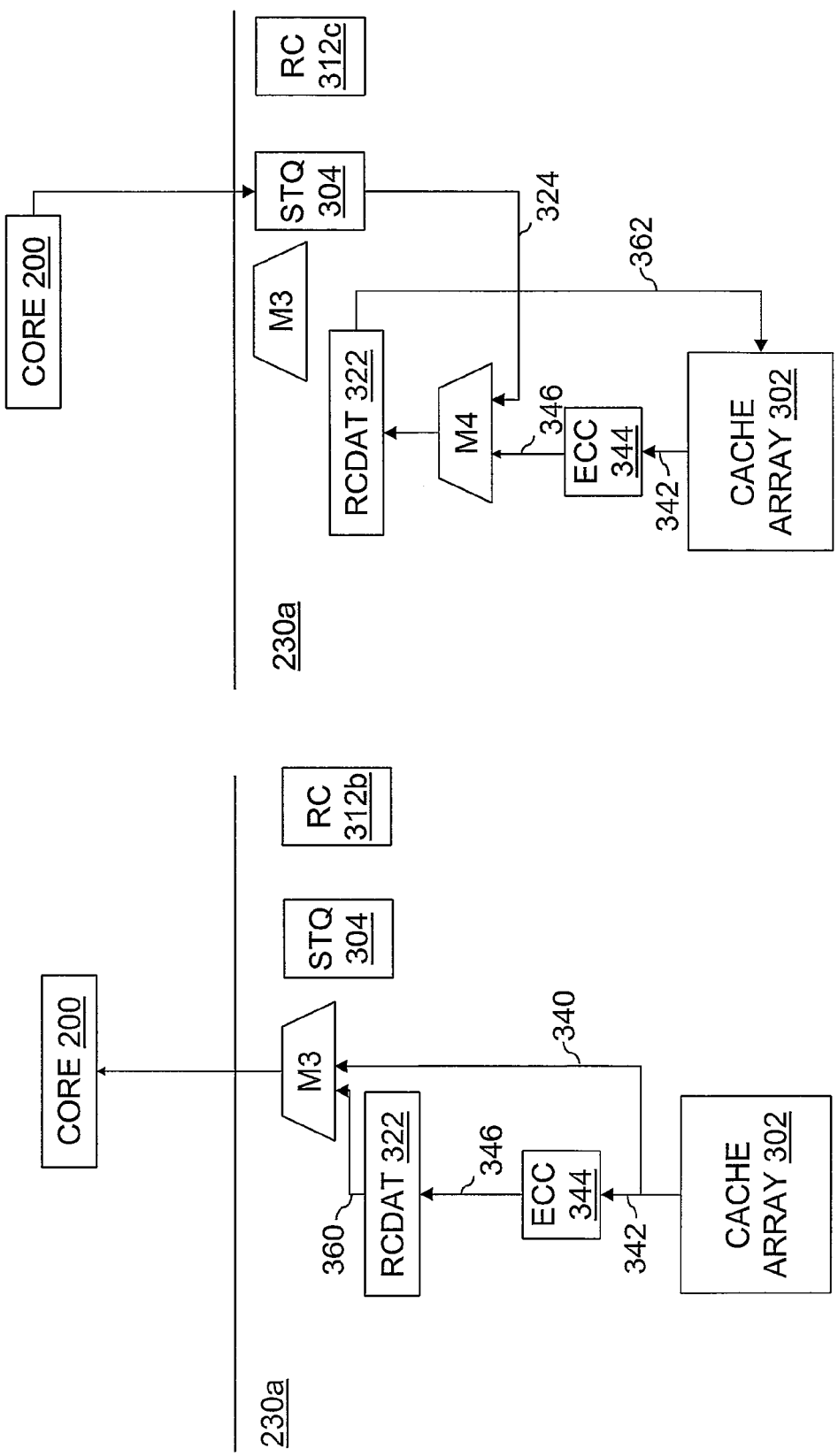

US 7,447,845 B2

DATA PROCESSING SYSTEM, PROCESSOR AND METHOD OF DATA PROCESSING IN WHICH LOCAL MEMORY ACCESS REQUESTS ARE SERVICED BY STATE MACHINES WITH DIFFERING FUNCTIONALITY

CROSS-REFERENCE TO RELATED APPLICATION

The present application is related to commonly assigned co-pending U.S. patent application Ser. No. 11/457,322, filed on the same date herewith and incorporated herein by reference in its entirety.

BACKGROUND OF THE INVENTION

1. Technical Field

The present invention relates generally to data processing, and in particular, to servicing processor operations in a data processing system. Still more particularly, the present invention relates to a data processing system, processor and method of data processing in which processor memory access requests are serviced by state machines with differing functionality.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Cache memories are commonly utilized to temporarily buffer memory blocks that might be accessed by a processor in order to speed up processing by reducing access latency introduced by having to load needed data and instructions from memory. In some multiprocessor (MP) systems, the cache hierarchy includes at least two levels. The level one (L1), or upper-level cache is usually a private cache associated with a particular processor core and cannot be accessed by other cores in an MP system. Typically, in response to a memory access instruction such as a load or store instruction, the processor core first accesses the directory of the upper-level cache. If the requested memory block is not found in the upper-level cache, the processor core then access lower-level caches (e.g., level two (L2) or level three (L3) caches) for the requested memory block. The lowest level cache (e.g., L3) is often shared among several processor cores.

In a conventional lower level cache, processor memory access requests are serviced by a state machine dispatched from a pool of identical state machines. Because each of these state machines must handle both load and store accesses under both cache hit and cache miss scenarios, the state machines tend to be complex in design and large in physical area, meaning that die size limitations can impact the number of state machines that can be conveniently be implemented, and hence, the number of concurrent processor operations that can be serviced. In addition, the complexity of the state machine design adversely impacts cache access latencies.

SUMMARY OF THE INVENTION

The present invention provides a data processing system, processor and method of data processing in which processor memory access requests are serviced by state machines with differing functionality.

According to one embodiment, a data processing system includes a local processor core and a cache memory coupled to the local processor core. The cache memory includes a data array, a directory of contents of the data array, at least one snoop machine that services memory access requests of a remote processor core, and multiple state machines that service memory access requests of the local processor core. The multiple state machines include a first state machine that has a first set of memory access requests of the local processor core that it is capable of servicing and a second state machine that has a different second set of memory access requests of the local processor core that it is capable of servicing.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5B is a more detailed view of a portion of an L2 cache slice circuitry that may be utilized by a special purpose load-hit RC machine in servicing a processor core load operation in accordance with the present invention;

FIG. 5C is a more detailed view of a portion of an L2 cache slice circuitry that may be utilized by a special purpose store-hit RC machine in servicing a processor core store operation accordance with the present invention.

DETAILED DESCRIPTION OF ILLUSTRATIVE EMBODIMENT(S)

Figure 1:
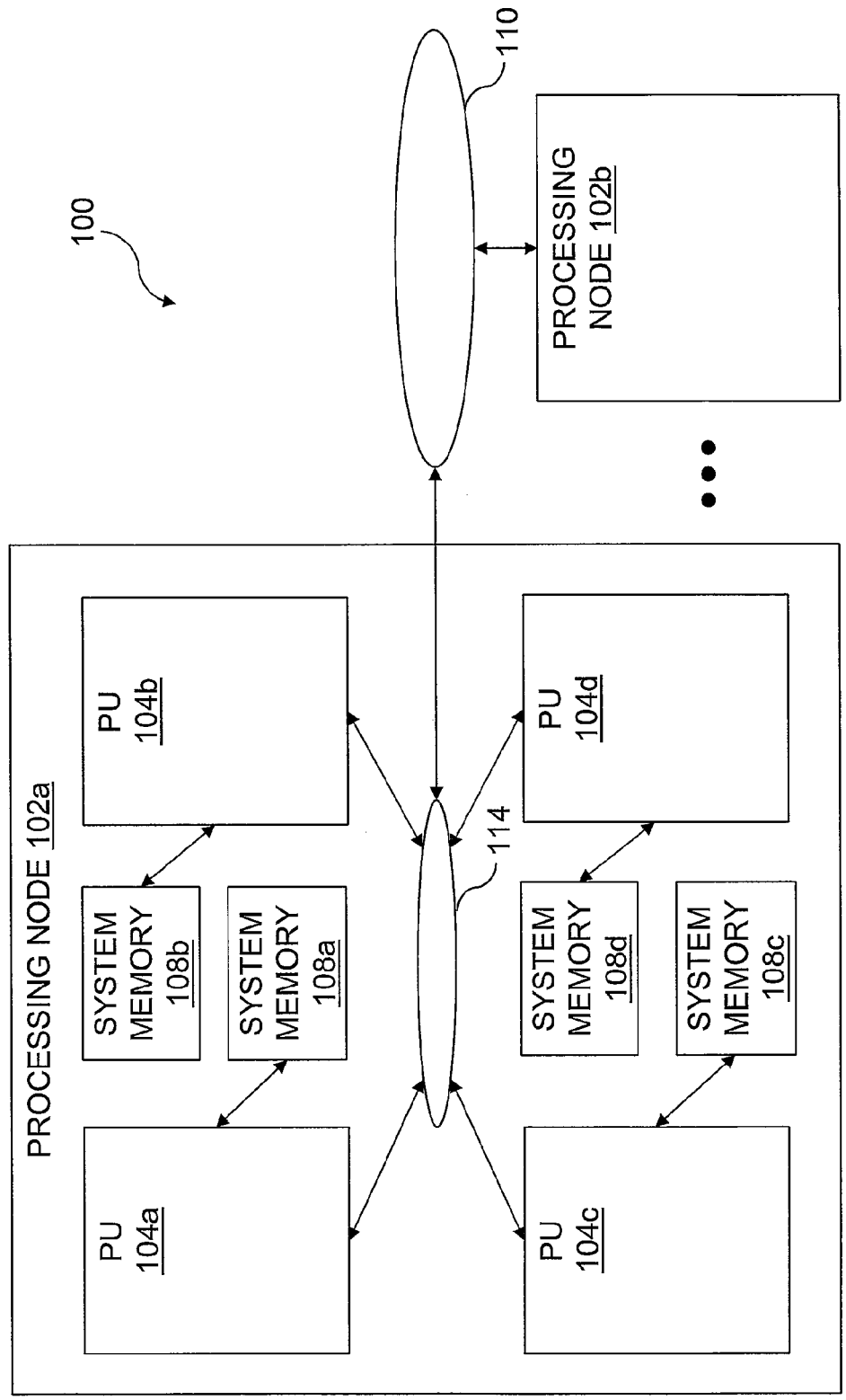
FIG. 1 is a high-level block diagram of an exemplary data processing system in accordance with the present invention.

With reference now to the figures, wherein like reference numerals refer to like and corresponding parts throughout, and in particular with reference to FIG. 1, there is illustrated a high-level block diagram depicting an exemplary data processing system in which the present invention may be implemented. The data processing system is depicted as a cache coherent symmetric multiprocessor (SMP) data processing system 100. As shown, data processing system 100 includes multiple processing nodes 102a, 102b for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches.

As described below in greater detail with reference to FIG. 2, processing units 104 each include a memory controller 106 coupled to local interconnect 114 to provide an interface to a respective system memory 108. Data and instructions residing in system memories 108 can generally be accessed and modified by a processor core in any processing unit 104 of any processing node 102 within data processing system 100. In alternative embodiments of the invention, one or more memory controllers 106 (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to cache coherent data processing systems of diverse architectures and are in no way limited to the generalized data processing system architecture illustrated in FIG. 1.

Figure 2:
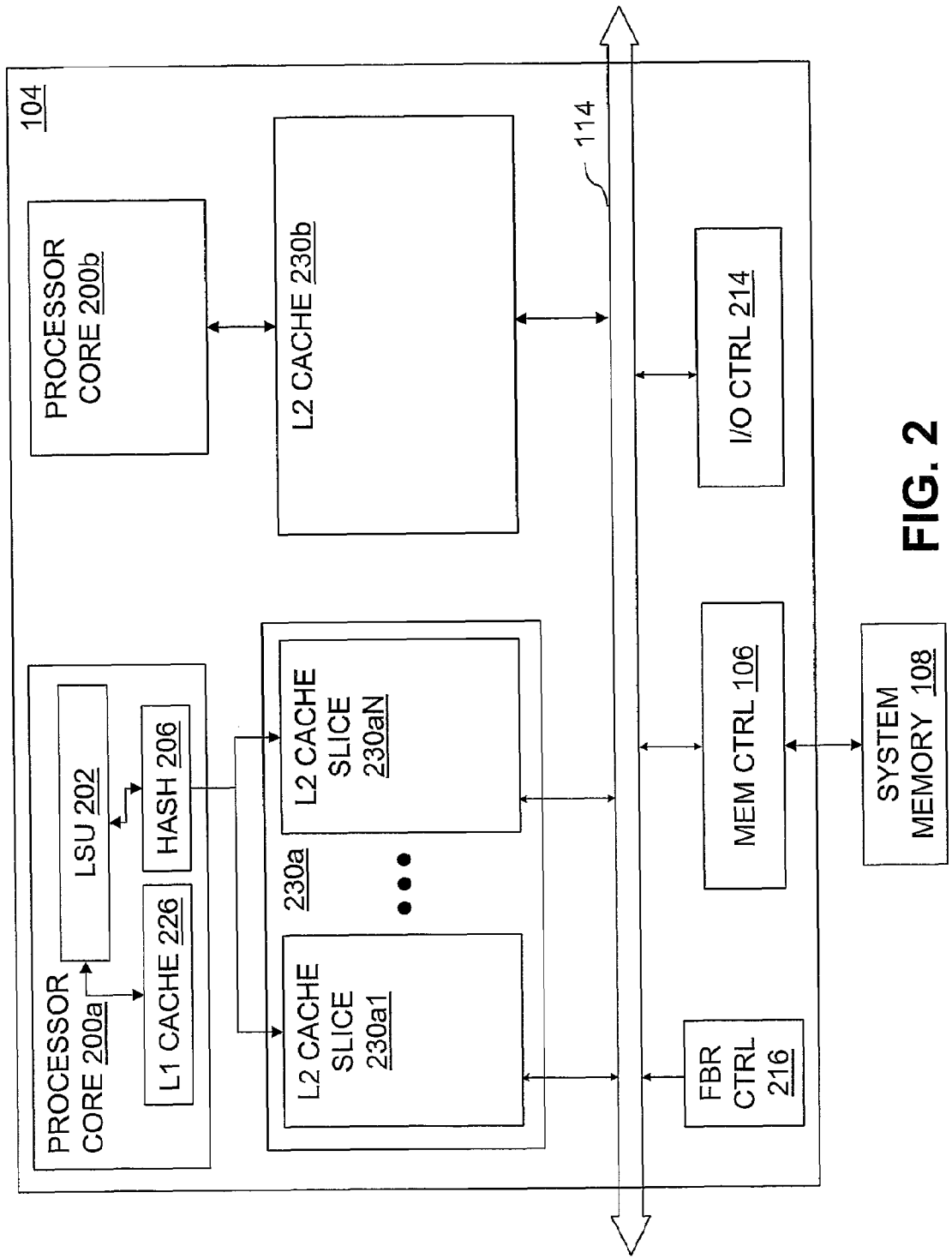
FIG. 2 is a more detailed block diagram of an exemplary processing unit in accordance with the present invention.

Referring now to FIG. 2, there is depicted a more detailed block diagram of an exemplary processing unit 104 in accordance with the present invention. In the depicted embodiment, each processing unit 104 is an integrated circuit including two processor cores 200a, 200b for processing instructions and data. In a preferred embodiment, each processor core 200 is capable of independently executing multiple hardware threads of execution simultaneously. As depicted, each processor core 200 includes one or more execution units, such as load-store unit (LSU) 202, for executing instructions. The instructions executed by LSU 202 include memory access instructions that request access to a memory block or cause the generation of a request for access to a memory block.

The operation of each processor core 200 is supported by a multi-level volatile memory hierarchy having at its lowest level a shared system memory 108 accessed via an integrated memory controller 106, and at its upper levels one or more levels of cache memory, which in the illustrative embodiment include a store-through level one (L1) cache 226 within and private to each processor core 200, and a respective store-in level two (L2) cache 230 for each processor core 200a, 200b. In order to efficiently handle multiple concurrent memory access requests to cacheable addresses, each L2 cache 230 is implemented with multiple L2 cache slices 230x1-230xN, each of which handles memory access requests for a respective set of real memory addresses.

Although the illustrated cache hierarchies includes only two levels of cache, those skilled in the art will appreciate that alternative embodiments may include additional levels (L3, L4, etc.) of on-chip or off-chip in-line or lookaside cache, which may be fully inclusive, partially inclusive, or non-inclusive of the contents the upper levels of cache.

Each processing unit 104 further includes an integrated and distributed fabric controller 216 responsible for controlling the flow of operations on local interconnect 114 and system interconnect 110 and for implementing the coherency communication required to implement the selected cache coherency protocol. Processing unit 104 further includes an integrated I/O (input/output) controller 214 supporting the attachment of one or more I/O devices (not depicted).

In operation, when a hardware thread under execution by a processor core 200 includes a memory access instruction requesting a specified memory access operation to be performed, LSU 202 executes the memory access instruction to determine the target real address of the memory access request. LSU 202 then transmits to hash logic 206 within its processor core 200 at least the memory access request, which includes at least a transaction type (ttype) and a target real address. Hash logic 206 hashes the target real address to identify the appropriate destination (e.g., L2 cache slice 230a1-230aN) and dispatches the request for servicing to the appropriate destination.

Figure 3:
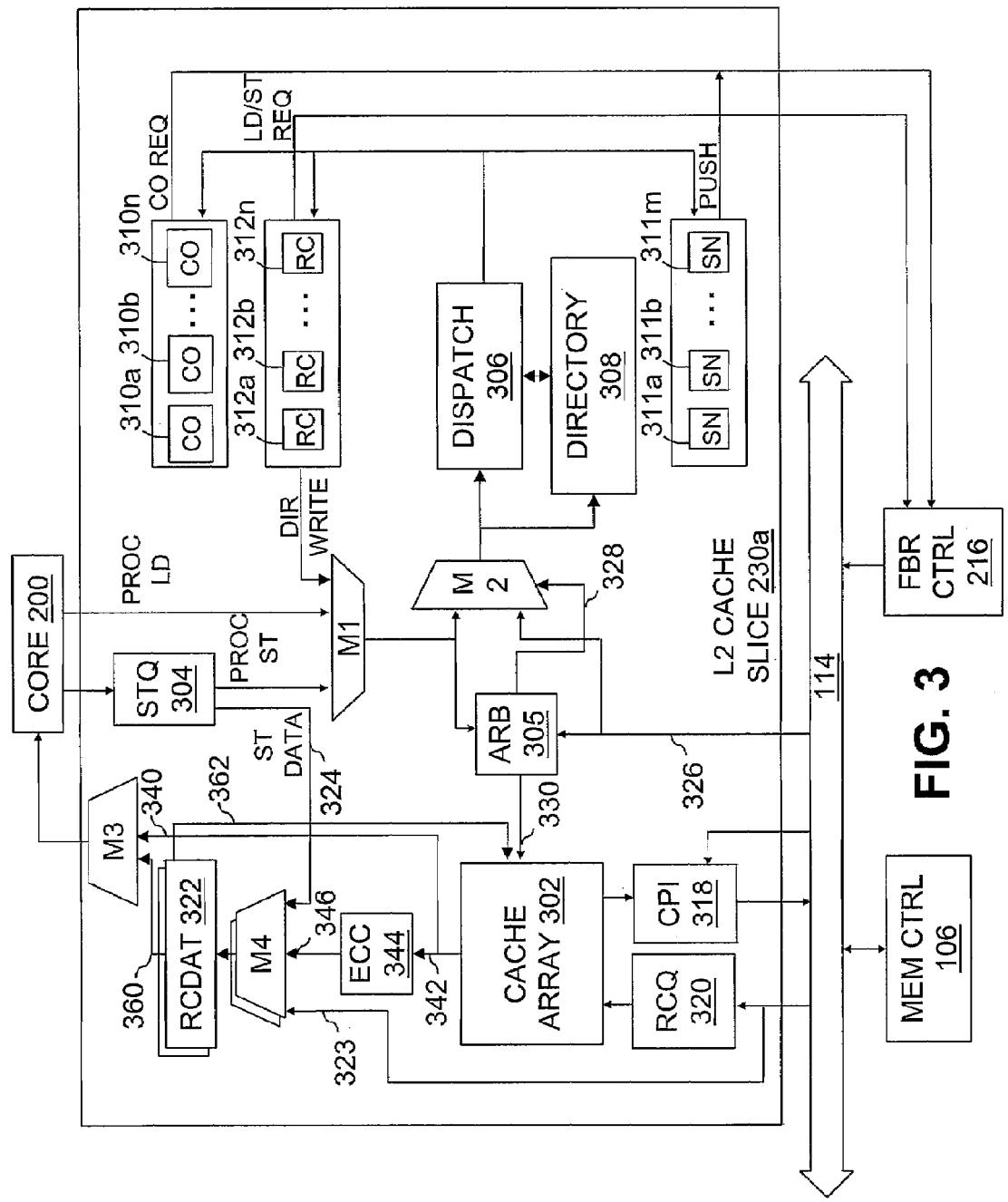
FIG. 3 is a more detailed block diagram of an L2 cache slice in accordance with the present invention.

With reference now to FIG. 3, there is illustrated a more detailed block diagram of an exemplary embodiment of one of L2 cache slice 230a1-230aN (referred to generically as L2 cache slice 230a) in accordance with the present invention. As shown in FIG. 3, L2 cache slice 230a includes a cache array 302 and a directory 308 of the contents of cache array 302. Although not explicitly illustrated, cache array 302 preferably is implemented with a single read port and single write port to reduce the die area required to implement cache array 302.

Assuming cache array 302 and directory 308 are set associative as is conventional, memory locations in system memories 108 are mapped to particular congruence classes within cache array 302 utilizing predetermined index bits within the system memory (real) addresses. The particular memory blocks stored within the cache lines of cache array 302 are recorded in cache directory 308, which contains one directory entry for each cache line. While not expressly depicted in FIG. 3, it will be understood by those skilled in the art that each directory entry in cache directory 308 includes various fields, for example, a tag field that identifies the real address of the memory block held in the corresponding cache line of cache array 302, a state field that indicate the coherency state of the cache line, and a LRU (Least Recently Used) field indicating a replacement order for the cache line with respect to other cache lines in the same congruence class.

L2 cache slice 230a includes multiple (e.g., 16) Read-Claim (RC) machines 312a-312n for independently and concurrently servicing load (LD) and store (ST) requests received from the affiliated processor core 200. However, in contrast to conventional RC machines 312 that are generally identical in die area and function and are capable of handling all types of processor memory access requests, at least some of RC machines 312 are preferably implemented as smaller special-purposes RC machines that are capable of handling fewer than all possible types of memory access requests received from the affiliated processor core 200. As will become apparent, implementing special-purpose RC machines in this manner substantially reduces the die area within processing unit 104 devoted to RC machines 312.

In order to service remote memory access requests originating from processor cores 200 other than the affiliated processor core 200, L2 cache slice 230a includes multiple snoop machines 311a-311m. Each snoop machine 311 can independently and concurrently handle a remote memory access request "snooped" from local interconnect 114.

As will be appreciated, the servicing of memory access requests by RC machines 312 may require the replacement or invalidation of memory blocks within cache array 302. Accordingly, L2 cache slice 230a includes CO (castout) machines 310 that manage the removal and writeback of memory blocks from cache array 302.

L2 cache slice 230a further includes an arbiter 305 that controls multiplexers M1-M2 to order the processing of local memory access requests received from affiliated processor core 200 and remote requests snooped on local interconnect 114. Memory access requests, including local load and store operations and remote read and write operations, are forwarded in accordance with the arbitration policy implemented by arbiter 305 to a dispatch pipeline 306 where each read/load and store request is processed with respect to directory 308 and cache array 302 over a given number of cycles.

L2 cache slice 230a also includes an RC queue 320 and a CPI (castout push intervention) queue 318 that respectively buffer data being inserted into and removed from the cache array 302. RC queue 320 includes a number of buffer entries that each individually correspond to a particular one of RC machines 312 such that each RC machine 312 that is dispatched retrieves data from only the designated buffer entry. Similarly, CPI queue 318 includes a number of buffer entries that each individually correspond to a particular one of the castout machines 310 snoop machines 311, such that each CO machine 310 and each snooper 311 that is dispatched retrieves data from only the respective designated CPI buffer entry.

Each RC machine 312 also has assigned to it a respective one of multiple RC data (RCDAT) buffers 322 for buffering a memory block read from cache array 302 and/or received from local interconnect 114 via reload bus 323. As described in greater detail below, the RCDAT buffer 322 assigned to each RC machine 312 is preferably constructed with connections and functionality corresponding to the memory access requests that may be serviced by the associated RC machine 312. As also discussed further below, some but not all of RCDAT buffers 322 have an associated store data multiplexer M4 that selects data bytes from among its inputs for buffering in the RCDAT buffer 322 in response unillustrated select signals generated by arbiter 305.

In operation, processor store requests comprising a transaction type (ttype), target real address and store data are received from the affiliated processor core 200 within a store queue (STQ) 304. From STQ 304, the store data are transmitted to store data multiplexer M4 via data path 324, and the store type and target address are passed to multiplexer M1. Multiplexer M1 also receives as inputs processor load requests from processor core 200 and directory write requests from RC machines 312. In response to unillustrated select signals generated by arbiter 305, multiplexer M1 selects one of its input requests to forward to multiplexer M2, which additionally receives as an input a remote request received from local interconnect 114 via remote request path 326. Arbiter 305 schedules local and remote memory access requests for processing and, based upon the scheduling, generates a sequence of select signals 328. In response to select signals 328 generated by arbiter 305, multiplexer M2 selects either the local request received from multiplexer M1 or the remote request snooped from local interconnect 114 as the next memory access request to be processed.

Figure 4:
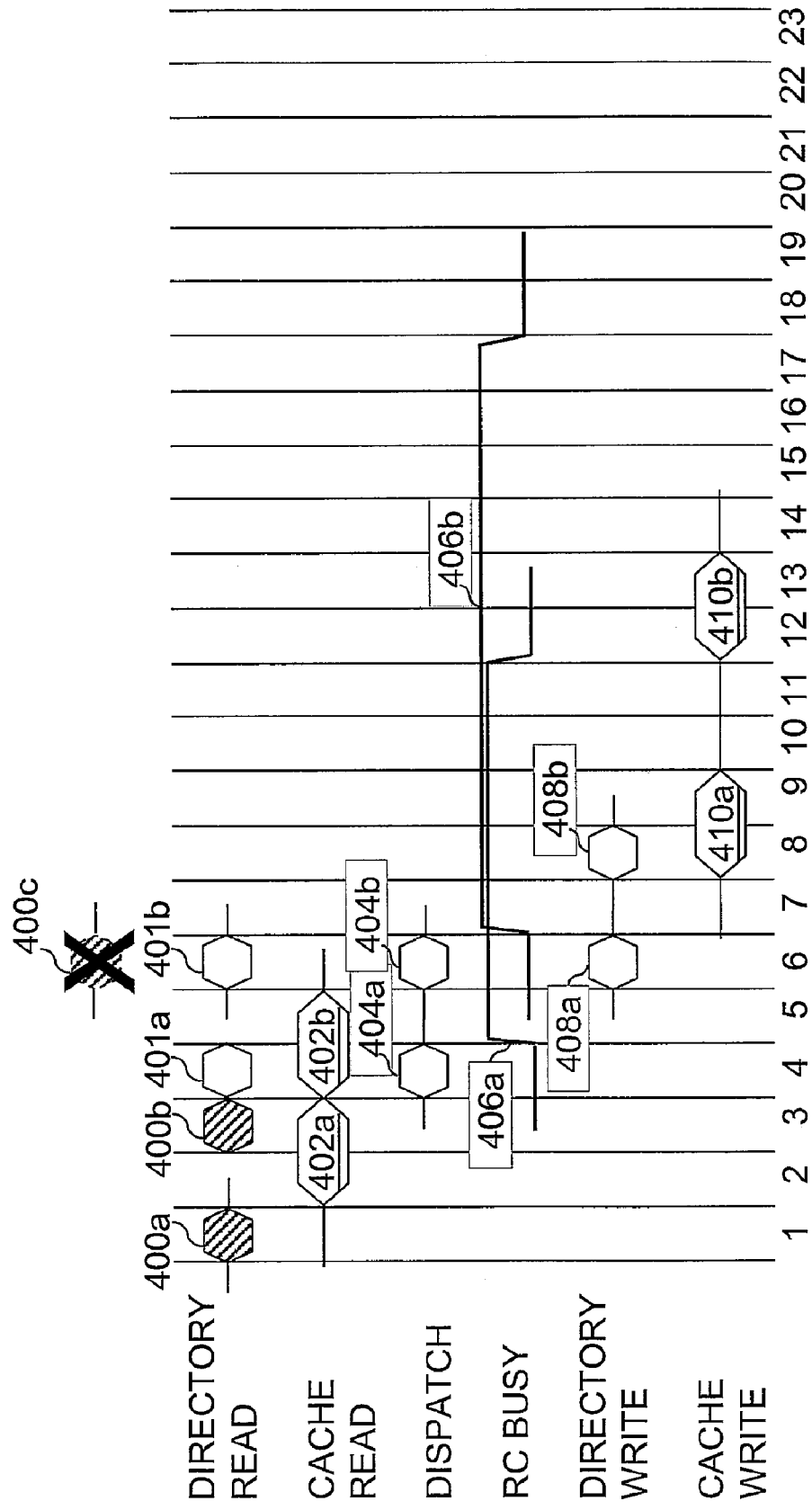
FIG. 4 is an exemplary timing diagram of the processing of a processor memory access operation in a lower level cache in accordance with the present invention.

Still referring to FIG. 3 and referring additionally to FIG. 4, which is a time line illustrating operations involved in servicing two memory access requests A and B (identified by reference numerals terminated by "a" and "b", respectively), the request selected for processing by arbiter 305 is placed by multiplexer M2 into dispatch pipeline 306. Dispatch pipeline 306 preferably is implemented as a fixed duration pipeline in which each of multiple possible overlapping requests A, B, C, etc. is processed for a predetermined number of clock cycles. In the exemplary embodiment shown in FIG. 4, dispatch pipeline 306 processes each request for 4 cycles.

During the first cycle of processing within dispatch pipeline 306, a 1-cycle directory read 400a, 400b is performed utilizing the request address to determine if the request address hits or misses in directory 308, and if the memory address hits, the coherency state of the memory block within directory 308. The directory information 401a, 401b, which includes a hit/miss indication and the coherency state of the memory block, is returned by directory 308 to dispatch pipeline 306 in a subsequent cycle, such as the fourth cycle As will be appreciated, no action is generally taken within an L2 cache slice 230a in response to miss on a remote memory access request; such remote memory requests are accordingly discarded from dispatch pipeline 306. However, in the event of a hit or miss on a local memory access request or a hit on a remote memory access request, L2 cache slice 230a will service the memory access request, which for requests that cannot be serviced entirely within processing unit 104, may entail communication on local interconnect 114 via fabric controller 216.

At a predetermined time during processing of the memory access request within dispatch pipeline 306, arbiter 305 transmits the request address to cache array 302 via address and control path 330 to initiate a cache read 402 of the memory block specified by the request address. As depicted in FIG. 4, cache read 402a, 402b takes 2 cycles in the exemplary embodiment. The memory block read from cache array 302 is transmitted via data path 342 to Error Correcting Code (ECC) logic 344, which checks the memory block for errors and, if possible, corrects any detected errors. For processor load requests, the memory block is also transmitted to load data multiplexer M3 via data path 340 for forwarding to the affiliated processor core 200.

At the last cycle of the processing of a memory access request within dispatch pipeline 306, dispatch pipeline 306 make a dispatch determination 404a, 404b. As discussed further below, dispatch pipeline 306 makes dispatch determination 404a, 404b based upon a number of criteria, including (1) the presence of an address collision between the request address and a previous request address currently being processed by a castout machine 310, snoop machine 311 or RC machine 312, (2) the directory information 401a, 401b, and (3) availability of an RC machine 312 or snoop machine 311 to process the memory access request. If dispatch pipeline 306 makes a dispatch determination 404a, 404b that the memory access request is to be dispatched, the memory access request is dispatched from dispatch pipeline 306 to an RC machine 312 or a snoop machine 311. If the memory access request fails dispatch, the failure is signaled to the requestor (e.g., local or remote processor core 200) by a retry response. The requester may subsequently retry the failed memory access request, if necessary.

As shown in FIG. 4, while an RC machine 312 is processing a local memory access request, the RC machine 312 has a busy status 406a or 406b and is not available to service another request. As indicated at reference numerals 408a, 408b, while an RC machine 312 has a busy status 406a or 406b, the RC machine 312 may perform a directory write 408a, 408b to update the relevant entry of directory 308, if necessary. In addition, the RC machine 312 may perform a cache write 410a, 410b to update the relevant cache line of cache array 302. Directory write 408a, 408b and cache write 410a, 410b may be scheduled by arbiter 305 during any interval in which dispatch pipeline 306 is not already processing other requests according to the fixed scheduling of directory reads 400a, 400b and cache reads 402a, 402b. As further shown in FIG. 4, when all operations for the given request have been completed, the RC machine 312 returns to an unbusy state.

It will be appreciated that the scheduling of non-fixed-schedule operations such as directory writes 408a, 408b and cache writes 410a, 410b can impact the scheduling of other operations, including those processed according to a fixed schedule. For example, assuming that directory 308 and cache array 302 support only a single read or write access during any given cycle, arbiter 305 cannot schedule a hypothetical memory access request C during cycle 6 because the directory read 400c of such a memory access request would conflict with directory write 408a of memory access request A.

Figure 5A:
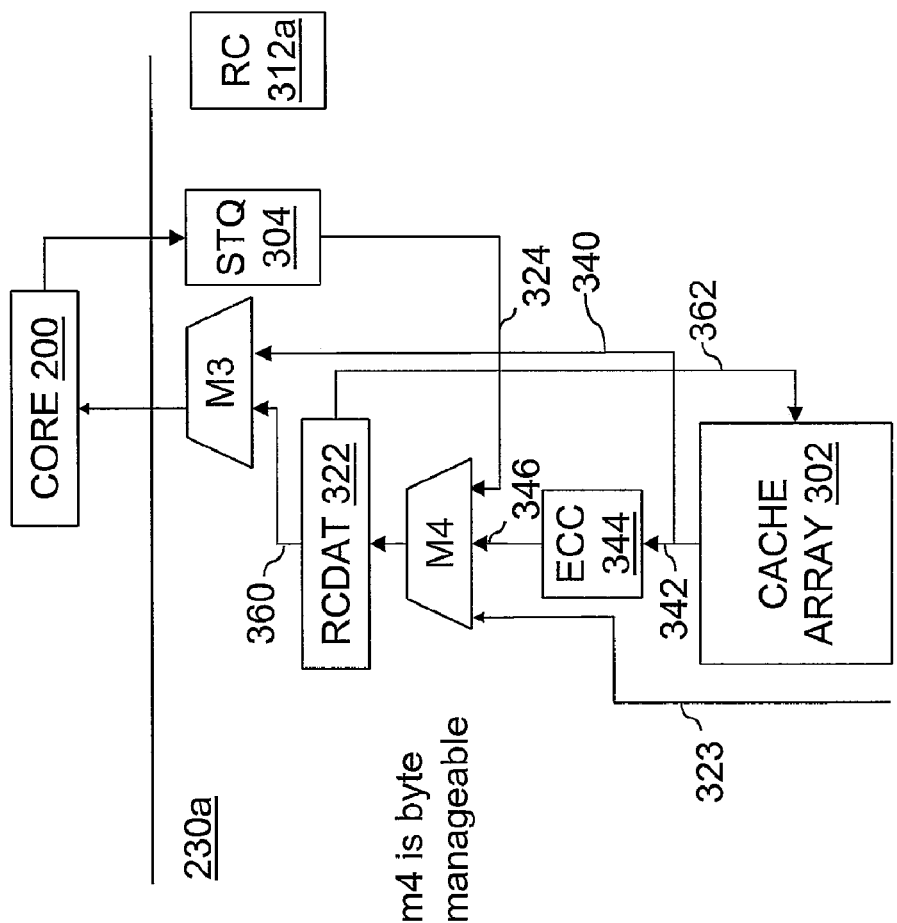
FIG. 5A is a more detailed view of a portion of an L2 cache slice circuitry that may be utilized by a general-purpose Read-Claim (RC) machine in accordance with the present invention.

With reference now to FIGS. 5A-5C, there are illustrated more detailed block diagrams respectively depicting data handling logic within L2 cache slice 230 associated with a general-purpose RC machine 312a, associated with a special-purpose RC machine 312b for servicing local load requests that hit within directory 308, and associated with a special-purpose RC machine 312c for servicing local store requests that hit within directory 308.

Referring first to FIG. 5A, general-purpose RC machine 312a includes conventional circuitry for servicing local load and local store requests regardless of whether the specified request addresses hit or miss in directory 308. Associated with general-purpose RC machine 312a is data handling circuitry, different portions of which are employed during the servicing of various types of local memory access requests. The operations that may be performed in servicing a local memory access request assigned to general-purpose RC machine 312a and the illustrated data path(s), if any, associated with the operations include:

1. directory read 400;
2. cache read 402;
3. for a local load request, forwarding an uncorrected copy of the target memory block to affiliated processor core 200 via data path 340 and load data multiplexer M3 and forwarding a copy of the target memory block to ECC logic 344 via data path 342;
4. forwarding a corrected copy of the target memory block to RCDAT buffer 322 via data path 346 and store data multiplexer M4, and in the case of an ECC error in the target memory block of the local load request, forwarding the corrected data from RCDAT 322 to affiliated processor core 200 via data path 360 and load data multiplexer M3;
5. for a local store request, merging store data received within RCDAT buffer 322 from STQ 304 via data path 324 and store data multiplexer M4 with the memory block read into RCDAT buffer 322 from cache array 302 via ECC logic 344 and store data multiplexer M4 (it should be noted that this store data merge operation requires a byte-manageable store data multiplexer M4 that selects its output data on a byte-by-byte basis);
6. for a local store request, performing a cache write 410 of the merged store data from RCDAT buffer 322 into cache array 302 via data path 362;
7. performing directory write 408 to update directory 308, if necessary;
8. back-invalidating L1 cache 226, if necessary;
9. for both local load requests and local store requests that miss, performing a castout of a memory block from cache array 302, if necessary, via CPI 318;
10. in response to a local load miss or local store miss, acquiring the target memory block through issuing a memory access operation on local interconnect 114 and loading the requested memory block into cache array 302 via reload bus 323, store data multiplexer M4, RCDAT buffer 322 (with store merge for a store miss) and data path 362; and
11. for a local store request, acquiring write ownership of the target memory block if directory read 400 indicates that L2 cache slice 230a does not currently have write ownership of the target memory block.

As will be appreciated from the foregoing description, all of the data handling circuitry depicted in FIG. 5A is utilized to service local load and store requests assigned to general-purpose RC machine 312a. However, only a subset of the depicted data handling circuitry is utilized to service local load requests and local store requests that hit in directory 308. The present invention accordingly recognizes that the die area allocated to the data handling circuitry corresponding to special-purpose RC machines 312 can be significantly reduced by implementing only the data handling circuitry required for the subset of operations performed by such special-purpose RC machines 312.

For example, referring now to FIG. 5B, there is illustrated a more detailed block diagram of the data handling circuitry associated with a special-purpose RC machine 312b for servicing local load requests that hit within directory 308. By restricting processing to local load hits, the operations that may be performed in servicing local memory access requests assigned to special-purpose RC machine 312b are reduced to:

1. directory read 400;
2. cache read 402;
3. forwarding an uncorrected copy of the target memory block to affiliated processor core 200 via data path 340 and load data multiplexer M3 and forwarding a copy of the target memory block to ECC logic 344 via data path 342;
4. in case of an ECC error in the target memory block of the local load request that is detected and corrected by ECC logic 344, forwarding a corrected copy of the target memory block to affiliated processor core 200 via data path 346, RCDAT buffer 322, data path 360, and load data multiplexer M3; and
5. performing directory write 408 to update directory 308, if necessary.

Because the operations that may be performed in servicing the local load hit are reduced, the data handling circuitry implemented for special-purpose RC machine 312b can be significantly simplified. For example, store data multiplexer M4 and associated data paths 323 and 324 are entirely eliminated from this instance of data handling circuitry. Data path 362, which is utilized to update cache array 302 with the contents of RCDAT buffer 322, is similarly eliminated from this instance of the data handling circuitry, simplifying RCDAT buffer 322.

As shown in FIG. 5C, similar reductions in die area can be achieved for the data handling circuitry associated with a special-purpose RC machine 312c for servicing local store requests that hit within directory 308 in a coherency state representing exclusive write ownership (e.g., Modified (M)). By restricting processing to local store hits, the operations that may be performed in servicing local memory access requests assigned to special-purpose RC machine 312c are reduced to:

1. directory read 400;
2. cache read 402;
3. for a local store request, merging store data received within RCDAT buffer 322 from STQ 304 via data path 324 and store data multiplexer M4 with the memory block read into RCDAT buffer 322 from cache array 302 via ECC logic 344 and store data multiplexer M4 (it should be noted that this store data merge operation requires a byte-manageable store data multiplexer M4 that selects its output data on a byte-by-byte basis);
4. for a local store request, performing a cache write 410 of the merged store data from RCDAT buffer 322 into cache array 302 via data path 362;
5. performing directory write 408 to update directory 308, if necessary;
6. back-invalidating L1 cache 226, if necessary; and
7. for both local load requests and local store requests that miss, performing a castout of a memory block from cache array 302, if necessary, via CPI 318.

Because the operations that may be performed in servicing the local store hit to M are reduced, the data handling circuitry implemented for special-purpose RC machine 312*c* are also simplified. In particular, the connection between reload bus 323 and store data multiplexer M4 is eliminated, simplifying the design of store data multiplexer M4. In addition, data paths 340 and 360, which are utilized exclusively to forward load data to affiliated processor core 200, are eliminated from this instance of the data handling circuitry, simplifying the design of RCDAT buffer 322.

As will be appreciated, a variety of types of special-purpose store hit machines 312 can be alternatively or concurrently implemented by tailoring each type to handle store hits in a particular data-valid coherency state. For example, a second type of special-purpose store hit machines 312 can be implemented for a non-exclusive data-modified coherency state that enables an L2 cache slice 230*a* to modify the cache line without obtaining permission from another agent, but requires the L2 cache slice 230*a* to initiate one or more kill operations on local interconnect 114 and/or system interconnect 110 to invalidate other cached copies of the memory block, if any. Similarly, a third type of special-purpose store hit machines 312 can be implemented for a shared coherency state (e.g., S) that requires an L2 cache slice 230*a* to obtain write permission through communication on local interconnect 114 and/or system interconnect 110.

Figure 6:
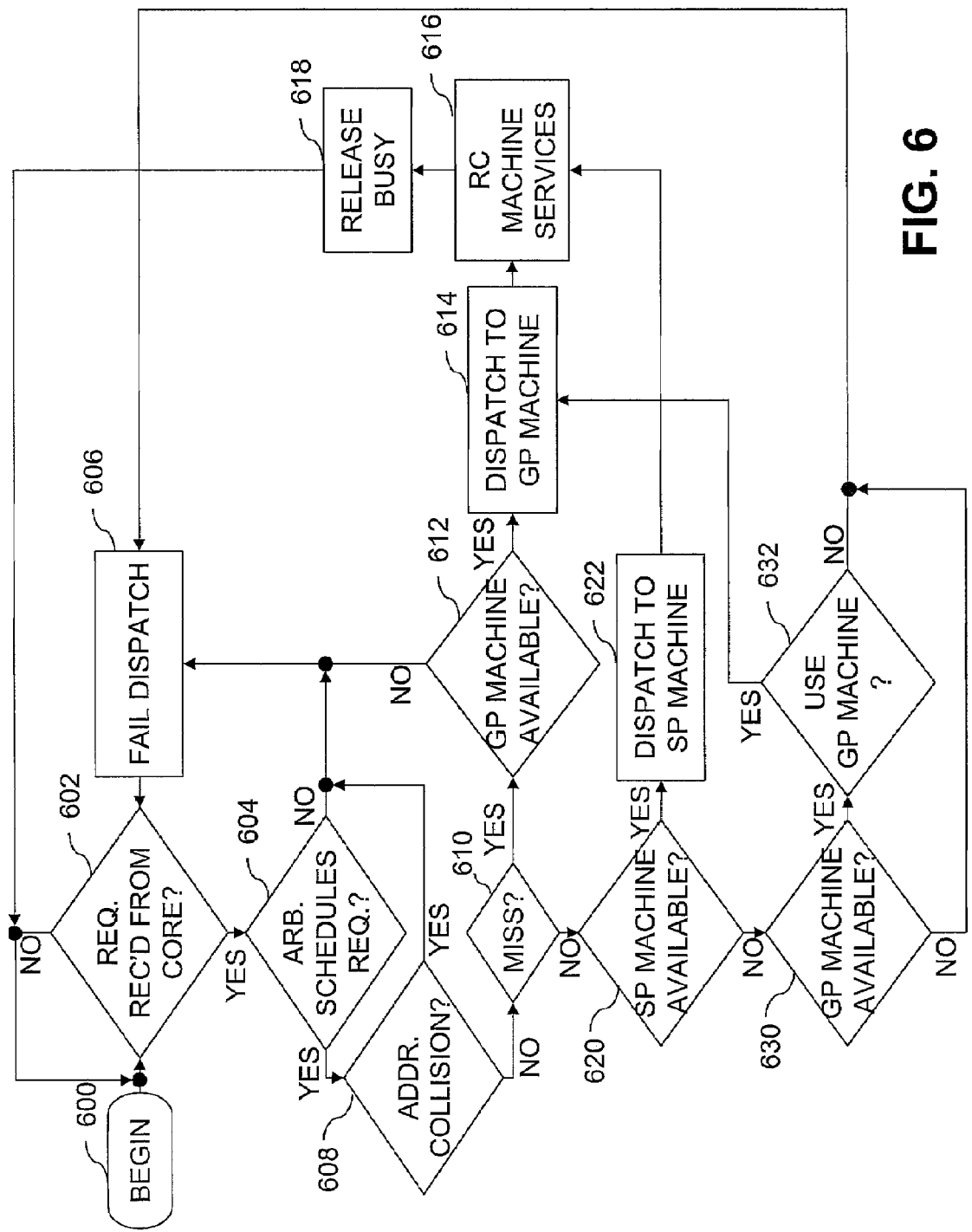
FIG. 6 is a high level logical flowchart of an exemplary process of servicing a processor memory access operation in accordance with the present invention.

Referring now to FIG. 6, there is depicted a high level logical flowchart of an exemplary process by which dispatch pipeline 306 dispatches local memory access requests (e.g., local load requests and local store requests) to RC machines 312 of differing capabilities in accordance with the present invention. As a logical flowchart, a logical rather than chronological flow of operations is depicted, and at least some of the depicted operations can be performed in an alternative order or concurrently.

As depicted, the process begins at block 600 and then proceeds to block 602, which illustrates arbiter 305 determining whether or not a local memory access request of the local processor core 200 has been received at the input of multiplexer M2. If not, arbiter 305 selects a remote memory access request or a directory write request of an RC machine 312, if available, for processing within dispatch pipeline 306, and the process returns to block 602. In response to a determination at block 602 that a local memory access request has been received at multiplexer M2, arbiter 305 determines at block 604 whether or not to schedule the local memory access request for processing within dispatch pipeline 306. If arbiter 305 determines at block 604 that the local memory request will not be scheduled for processing within dispatch pipeline 306, for example, because of a conflicting directory write 408 or cache write 410, the process passes to block 606. Block 606 depicts the local memory access request failing dispatch, which failure is reported to the requester (e.g., processor core 200 or RC machine 312) via a retry signal. Thereafter, the process returns to block 602.

Returning to block 604, in response to arbiter 305 scheduling the local memory access request for dispatch, the local memory access request is processed within dispatch pipeline 306, as described above with reference to FIG. 4. At the conclusion of such processing, dispatch pipeline 306 makes a dispatch determination for the local memory access request, as shown at reference numeral 404. As part of the dispatch determination, dispatch pipeline 306 determines at block 608 whether or not an address collision prevents dispatch of the local memory access request, that is, whether the target address of the local memory access request matches the target address of a request currently being processed by an CO machine 310, snoop machine 311 or RC machine 312. In response to a detection of an address collision at block 608, the local memory access request fails dispatch, as indicated at block 606. Dispatch pipeline 306 reports the failure to the requester (e.g., processor core 200 or RC machine 312) via a retry signal. Thereafter, the process returns to block 602.

Referring again to block 608, in response to a determination that no address collision prevents dispatch, dispatch pipeline 306 also determines at block 610 whether or not directory information 401 indicates that the target address of the local memory access request hit or missed in directory 308. If a miss occurred, the process proceeds to block 612, which illustrates whether or not a general-purpose RC machine 312, for example, general-purpose RC machine 312*a* is available to service the request. If not, the dispatch of the request fails, as indicated at block 606, and the process returns to block 602. However, if dispatch pipeline 306 determines at block 612 that a general-purpose RC machine 312 capable of handling a request that missed directory 308 is available (i.e., unbusy), the process proceeds to block 614, which illustrates dispatch pipeline 306 dispatching the request to the general-purpose RC machine 312. In response to receipt of the request, the general-purpose machine 312 transitions to busy state 406 and services the request, as depicted at block 616. While in the busy state, RC machine 312 "protects" the target memory address by preventing other accesses to the target memory address and provides responses to directory reads for the target address. After all of the operations occasioned by the local memory access request have been completed, the general-purpose RC machine 312 releases its busy state and returns to an unbusy state, as shown at block 618. Thereafter, the process returns to block 602, which has been described.

Referring again to block 610, in response to dispatch pipeline 306 determining that directory read 400 resulted in a hit, dispatch pipeline 306 determines at block 620 whether or not a special-purpose RC machine 312 is available (i.e., unbusy) that has capabilities matching the operations that may be required by the local memory access request. For example, if the local memory access request is a load request, dispatch pipeline 306 determines if a special-purpose RC machine 312*b* is available. Similarly, if the local memory access request is a store request, dispatch pipeline 306 determines if a special-purpose RC machine 312*c* is available. If so, dispatch pipeline 306 dispatches the local memory access request to the available special-purpose RC machine 312, as depicted at block 622. Thereafter, the process passes to block 616 and following blocks, which have been described.

In response to a negative determination at block 620, dispatch pipeline 306 next determines at block 630 whether or not a general-purpose RC machine 312 is available (i.e., unbusy). If not, dispatch pipeline 306 does not dispatch the local memory access request, as indicated at block 606, and the process returns to block 602. If, however, dispatch pipeline 306 determines at block 630 that a general-purpose RC machine 312 is available, dispatch pipeline 306 also determines at block 632 whether or not to devote a general-purpose RC machine 312 to the local memory access request. For example, dispatch pipeline 306 may make the depicted determination based upon one or more criteria, including the number of available general-purpose RC machines 312, the relative frequency of cache misses, whether the type of request (e.g., load request or store request,).

In response to a determination at block 632 that the available general-purpose RC machine 312 should not be used to service the local memory access request, dispatch pipeline 306 does not dispatch the local memory access request, as shown at block 606, and the process returns to block 602. Referring again to block 632, in response to a determination at block 632 that the available general-purpose RC machine 312 should be used to service the local memory access request, dispatch pipeline 306 dispatches the local memory access request to the general-purpose RC machine, as depicted at block 614. Thereafter, the process continues at block 616 and following blocks, which have been described.

As has been described, the present invention provides an improved data processing system, processing unit and method of data processing in which memory access requests of a processor core are serviced within an associated lower level cache by a pool of state machines having disparate capabilities. For example, in one embodiment, certain of the state machines are implemented as special-purpose state machines that can only handle local load requests that hit in the lower level cache, while others are implemented as special-purpose state machines that can only handle local store requests that hit in the lower level cache. The special-purpose machines for store requests can further be limited to store hits in a modified (M) coherency state. By restricting the functionality of a special-purpose state machines in this manner, up to 50% or more of the die area devoted to the state machine can be saved. Additional area savings is possible by reducing the corresponding data handling circuitry. The cumulative area savings achieved by the present invention permits a significant overall reduction in the die area utilized for circuitry that services local processor core memory access requests and/or the implementation of a greater number of state machines.

While the invention has been particularly shown and described with reference to a preferred embodiment, it will be understood by those skilled in the art that various changes in form and detail may be made therein without departing from the spirit and scope of the invention. These alternate implementations all fall within the scope of the invention.

What is claimed is:

1. A data processing system, comprising:
   a local processor core; and
   a cache memory coupled to the local processor core, said cache memory including:
   a data array;
   a directory of contents of said data array;
   multiple state machines that service memory access requests of said local processor core, wherein said multiple state machines include a first state machine that has a first set of memory access requests of said local processor core that it is capable of servicing and a second state machine that has a different second set of memory access requests of said local processor core that it is capable of servicing; and
   at least one snoop machine that services memory access requests of a remote processor core.

2. The data processing system of claim 1, wherein said first state machine comprises a general-purpose state machine that can service any memory access request of said local processor core.

3. The data processing system of claim 1, wherein:
   a memory access request of said local processor core specifies a target memory address;
   said directory indicates whether a cache hit occurred for said memory access request based upon the target memory address; and
   said data processing system further comprises a dispatch pipeline that selects one of said first and second state machines to service the memory access request based upon whether said directory indicated that a cache hit occurred for said memory access request.

4. The data processing system of claim 1, wherein:
   said first set of memory access requests is larger than said second set of memory access requests;
   said data processing system further comprises a dispatch pipeline that assigns memory access requests to said multiple state machines for service; and
   said dispatch pipeline, for a given memory access request belonging to both said first and second sets of requests, preferentially selects said second state machine to service said given memory access request over said first state machine.

5. The data processing system of claim 1, wherein said second set of memory access requests includes only memory access requests that hit in said directory.

6. The data processing system of claim 1, wherein:
   said first set of memory access requests includes only load requests; and
   said second set of memory access requests includes only store requests.

7. The data processing system of claim 6, wherein:
   said first set of memory access requests includes only load requests that hit in said directory;
   said second set of memory access requests includes only store requests that hit in said directory; and
   said multiple state machines include a third state machine that has a third set of memory access requests of said local processor core that it can service, wherein said third set of memory access requests includes at least load requests that miss in said directory and store requests that miss in said directory.

8. The data processing system of claim 1, and further comprising:
   multiple data buffers each associated with a respective one of said multiple state machines, said multiple data buffers including a first data buffer associated with said first state machine and a second data buffer associated with said second state machine;
   a store data multiplexer having a multiplexer output and at least first and second multiplexer inputs, wherein said first multiplexer input is coupled to receive store data from said data array, said second multiplexer input is coupled to receive store data from said local processor core, and said multiplexer output is coupled to said first data buffer, wherein said first data buffer has an output coupled to a write port of said data array; and
   a load data path for conveying load data to the local processor core;

wherein said second data buffer is coupled to receive load data from said data array and to output load data on said load data path.

9. The data processing system of claim 1, and further comprising:
an interconnect fabric coupled to the processor core;
at least one lower level memory coupled to the interconnect fabric; and
the remote processor core coupled to the interconnect fabric.

10. A method of data processing in a data processing system, said method comprising:
a cache memory receiving, from a local processor core, memory access requests of diverse types;
for each memory access request received from the local processor core, selecting from among multiple state machines to determine a state machine to service that memory access request, said multiple state machines including a first state machine that has a first set of memory access requests of said local processor core that it is capable of servicing and a second state machine that has a different second set of memory access requests of said local processor core that it is capable of servicing;
servicing each memory access request received from the local processor core utilizing the selected state machine; and
the cache memory servicing memory access requests of a remote processor core utilizing at least one snoop machine.

11. The method of claim 10, wherein:
said first state machine comprises a general-purpose state machine;
said first set of memory access requests includes all memory access requests of said local processor core;
said second state machine comprises a special-purpose state machine with more restricted capabilities than said first state machine; and
said second set of memory access requests includes only a subset of said first set of memory access requests.

12. The method of claim 10, wherein:
each of said memory access request of said local processor core specifies a target memory address;
said method further comprises is determining if each target memory address hits in a directory of said cache memory; and said selecting comprises selecting one of said first and second state machines to service the memory access request based upon whether said target memory address of the memory access request hits in said cache memory.

13. The method of claim 10, wherein:
said first set of memory access requests is larger than said second set of memory access requests;
said selecting comprises preferentially selecting said second state machine to service a given memory access request over said first state machine if said given memory access request belongs to said second set of memory access requests.

14. The method of claim 10, wherein said second set of memory access requests includes only memory access requests that hit in said directory.

15. The method of claim 10, wherein:
said first set of memory access requests includes only load requests; and
said second set of memory access requests includes only store requests.

16. The method of claim 15, wherein:
said first set of memory access requests includes only load requests that hit in said directory;
said second set of memory access requests includes only store requests that hit in said directory; and
said multiple state machines include a third state machine that has a third set of memory access requests of said local processor core that it is capable of servicing, wherein said third set of memory access requests includes at least load requests that miss in said directory and store requests that miss in said directory.

17. The method of claim 10, and further comprising:
within the cache memory, implementing diverse data handling circuitry for said first and second state machines.

18. The method of claim 10, and further comprising:
in response to selecting a particular state machine to service a given memory access request, changing a state of the particular state machine to a busy state in which the particular state machine is unavailable for selection to service other memory access requests;
while said particular state machine is in said busy state, performing any cache update required to service the given memory access request; and
after servicing the memory access request, updating a state of the particular state machine to an available state.

* * * * *